US012347299B2

(12) United States Patent
Cho

(10) Patent No.: US 12,347,299 B2
(45) Date of Patent: Jul. 1, 2025

(54) FIRE ALARM DEVICE HAVING TRAFFIC CONTROL FUNCTION

(71) Applicant: ROZETATECH Co., Ltd., Seongnam-si (KR)

(72) Inventor: Young Jin Cho, Chungcheongbuk-do (KR)

(73) Assignee: ROZETATECH CO., LTD., Seongnam-si (KR)

( * ) Notice: Subject to any disclaimer, the term of this patent is extended or adjusted under 35 U.S.C. 154(b) by 40 days.

(21) Appl. No.: 18/264,889

(22) PCT Filed: Jan. 11, 2022

(86) PCT No.: PCT/KR2022/000440
§ 371 (c)(1),
(2) Date: Aug. 9, 2023

(87) PCT Pub. No.: WO2022/177154
PCT Pub. Date: Aug. 25, 2022

(65) Prior Publication Data
US 2024/0119825 A1    Apr. 11, 2024

(30) Foreign Application Priority Data
Feb. 16, 2021    (KR) .................. 10-2021-0020656

(51) Int. Cl.
*G08B 25/00*    (2006.01)
*G08B 17/00*    (2006.01)
(Continued)

(52) U.S. Cl.
CPC ........... *G08B 25/008* (2013.01); *G08B 17/00* (2013.01); *G08B 25/10* (2013.01); *G08B 29/20* (2013.01); *H04B 17/318* (2015.01)

(58) Field of Classification Search
CPC ...... G08B 25/008; G08B 17/00; G08B 25/10; G08B 29/20; H04B 17/318
See application file for complete search history.

(56) References Cited

U.S. PATENT DOCUMENTS 9,887,760 B1 *   2/2018   Sridharan ............ H04B 17/318
11,488,460 B2 *  11/2022  Cho ....................... G08B 29/16
(Continued)

FOREIGN PATENT DOCUMENTS

KR    1020170003377 A    1/2017
KR    1020170141590 A    12/2017
(Continued)

OTHER PUBLICATIONS

International Search Report of the International Searching Authority, mailed on Apr. 19, 2022, from International Application No. PCT/KR2022/000440, filed on Jan. 11, 2022, 4 pages.
(Continued)

*Primary Examiner* — John A Tweel, Jr.
(74) *Attorney, Agent, or Firm* — HoustonHogle LLP

(57) ABSTRACT

A fire alarm device according to an embodiment of the present invention includes a first sensing unit disposed in a first zone, and configured to detect the occurrence of a fire and generate a first fire detection signal, a first repeater configured to perform wireless communication with the first sensing unit, a first receiver configured to perform wireless communication with the first repeater, a second sensing unit disposed in a second zone spaced apart from the first zone, and configured to detect the occurrence of a fire and generate a second fire detection signal, a second repeater configured to perform wireless communication with the second sensing unit, and a second receiver configured to perform wireless communication with the second repeater, wherein when information on the second fire detection signal is received, the first receiver transmits a control signal to the second (Continued)

sensing unit, wherein the second sensing unit adjusts the strength of the second fire detection signal based on the control signal.

15 Claims, 10 Drawing Sheets

(51) Int. Cl.
G08B 25/10 (2006.01)
G08B 29/20 (2006.01)
H04B 17/318 (2015.01)

(56) References Cited

U.S. PATENT DOCUMENTS

2015/0061877 A1    3/2015  Kates
2023/0368650 A1*  11/2023  Cho ..................... G08B 25/009

FOREIGN PATENT DOCUMENTS

| KR | 101924854 B1 | 12/2018 |
| KR | 1020190042503 A | 4/2019 |
| KR | 102160560 B1 | 9/2020 |
| KR | 102188138 B1 | 12/2020 |
| WO | WO 2017217569 A1 | 12/2017 |

OTHER PUBLICATIONS

International Preliminary Report on Patentability, mailed on Aug. 31, 2023, from International Application No. PCT /KR2022/ 000440, filed on Jan. 11, 2022. 14 pages.

* cited by examiner

FIRE ALARM DEVICE HAVING TRAFFIC CONTROL FUNCTION

RELATED APPLICATIONS

This application is a § 371 National Phase Application of International Application No. PCT/KR2022/000440, filed on Jan. 11, 2022, now International Publication No. WO/2022/177154 A1, published on Aug. 25, 2022, which International Application claims priority to Republic of Korean Application No. 10-2021-0020656, filed on Feb. 16, 2021, both of which are incorporated herein by reference in their entirety.

TECHNICAL FIELD

The present invention relates to a fire alarm device having a traffic control function, and more particularly, to a fire alarm device having a traffic control function with improved reliability since each of a plurality of sensing units adjusts the magnitude of an output based on signal strength, thereby preventing unnecessary signal transmission.

BACKGROUND ART

A fire alarm device is a device that detects smoke caused by a fire using a sensing unit and notifies of a fire situation when a fire occurs. Since the fire alarm device is installed in each of a plurality of zones and determines a fire using a sensing unit, the fire alarm device is highly likely to detect unnecessary signals of other zones between adjacent zones. If the fire alarm device continuously malfunctions due to the above factors, users may lose credibility in the fire alarm device, and thus, are more likely to turn off the fire alarm device usually. In this case, even when there is an actual fire in a zone where the fire alarm device is installed, the users may be exposed to the risk of the fire.

DISCLOSURE OF THE INVENTION

Technical Problem

An object of the present invention is to provide a fire alarm device having a traffic control function.

Technical Solution

A fire alarm device according to an embodiment of the present invention includes a first sensing unit disposed in a first zone, and configured to detect the occurrence of a fire and generate a first fire detection signal, a first repeater configured to perform wireless communication with the first sensing unit, a first receiver configured to perform wireless communication with the first repeater, a second sensing unit disposed in a second zone spaced apart from the first zone, and configured to detect the occurrence of a fire and generate a second fire detection signal, a second repeater configured to perform wireless communication with the second sensing unit, and a second receiver configured to perform wireless communication with the second repeater, wherein when information on the second fire detection signal is received, the first receiver transmits a control signal to the second sensing unit, wherein the second sensing unit adjusts the strength of the second fire detection signal based on the control signal.

When the value of the control signal is greater than the magnitude of reference signal strength, the second sensing unit may reduce the strength of the second fire detection signal.

The second sensing unit may be provided in plurality, wherein each of the plurality of second sensing units may include a sensor configured to generate the second fire detection signal when it is determined that it is a fire situation by detecting at least one of smoke, temperature, humidity, or gas, a sensing memory unit configured to store the reference signal strength, an amplification unit configured to generate an amplified fire alarm signal by amplifying the second fire detection signal received from at least one of a plurality of adjacent sensing units, a sensing control unit configured to control the strength of the second fire detection signal, and a sensing communication unit configured to receive the second fire detection signal or the amplified fire alarm signal, transmit the second fire detection signal or the amplified fire alarm signal to the repeater, and receive the control signal.

The control signal may include a received signal strength indicator (RSSI).

When the second fire detection signal is received, the first receiver may further transmit an acknowledgment signal for the second fire detection signal to the second sensing unit.

The acknowledgment signal and the control signal may be integrally transmitted.

The acknowledgment signal and the control signal may be provided in the same data frame.

When the first fire detection signal is received, the first receiver may transmit an acknowledgment signal for the first fire detection signal and the control signal to the first sensing unit.

The first receiver may transmit the control signal to the first sensing unit, and the first sensing unit may adjust the strength of the first fire detection signal based on the control signal.

When the value of the control signal is greater than the magnitude of the reference signal strength, the first sensing unit may reduce the strength of the first fire detection signal.

A fire alarm device according to an embodiment of the present invention includes a plurality of sensing units configured to detect the occurrence of a fire and generate a fire detection signal, a repeater configured to perform wireless communication with each of the plurality of sensing units, and a receiver configured to perform wireless communication with the repeater, wherein the receiver transmits a control signal to each of the plurality of sensing units, wherein each of the plurality of sensing units adjusts the strength of the fire detection signal based on the control signal.

When the value of the control signal is greater than the magnitude of reference signal strength, the sensing unit may reduce the strength of the fire detection signal.

The control signal may be a received signal strength indicator (RSSI).

When the first fire detection signal is received, the receiver may further transmit an acknowledgment signal for the fire detection signal to each of the plurality of sensing units.

The acknowledgment signal and the control signal may be integrally transmitted.

The acknowledgment signal and the control signal may be provided in the same data frame.

Advantageous Effects

As described above, a receiver may transmit a control signal to a sensing unit, and the sensing unit may adjust the strength of a fire detection signal based on the control signal. That is, the sensing unit may reduce the strength of the fire detection signal to prevent the fire detection signal from being transmitted to another zone. Accordingly, it is possible to provide a fire alarm device having a traffic control function with improved reliability by preventing unnecessary signal transmission and reception.

MODE FOR CARRYING OUT THE INVENTION

Figure 1:
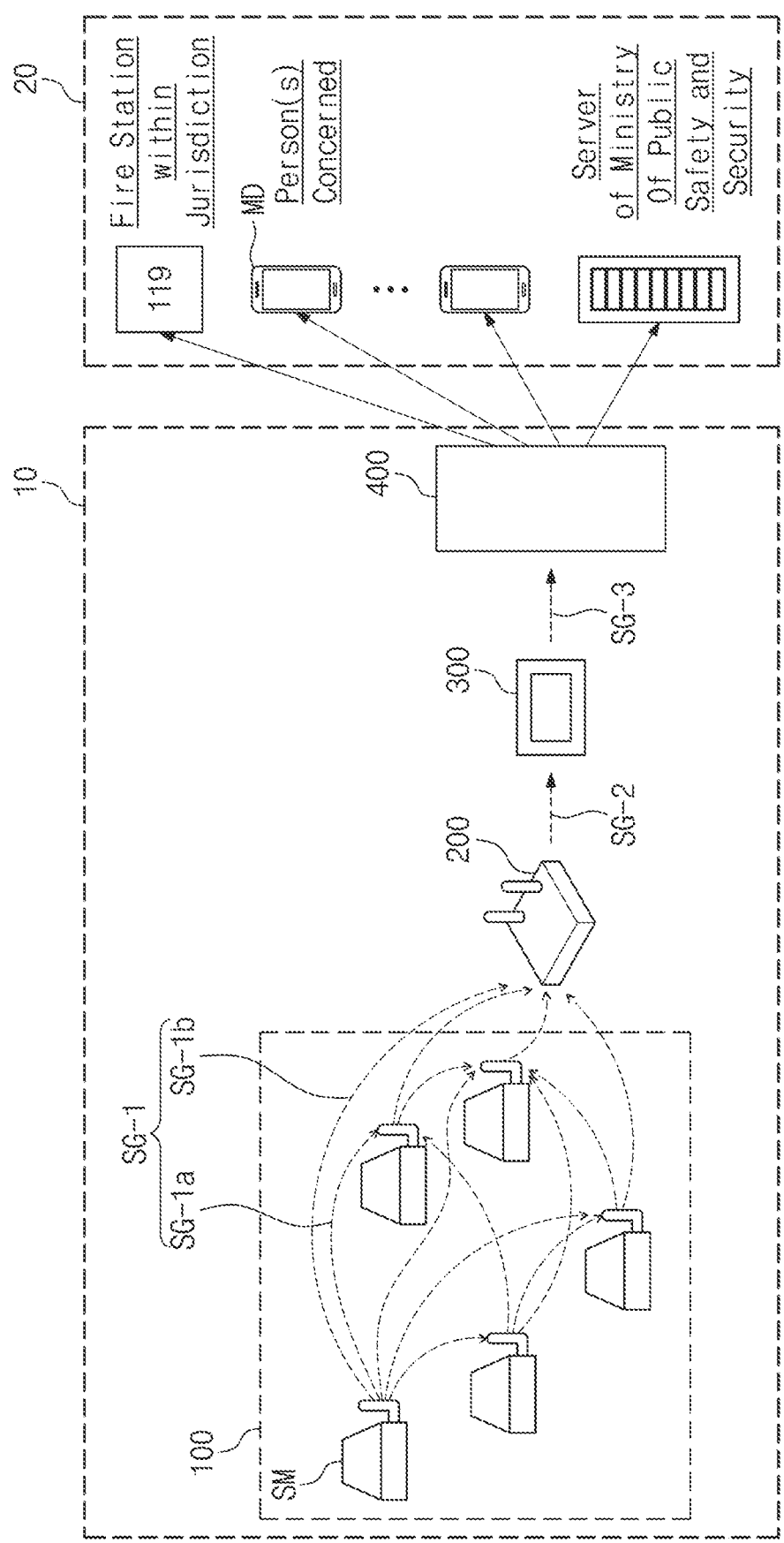
FIG. 1 illustrates a fire alarm device according to an embodiment of the present invention.

In the present disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents.

The term "and/or" includes any and all combinations of one or more of which associated elements may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the present invention. The terms of a singular form may include plural forms unless the context clearly indicates otherwise.

In addition, terms such as "below," "lower," "above," "upper," and the like are used to describe the relationship of components shown in the drawings. The terms are used as a relative concept and are described with reference to the direction indicated in the drawings. Unless otherwise defined, all terms (including technical and scientific terms) used herein have the same meaning as commonly understood by one of ordinary skill in the art to which the present invention pertains. It is also to be understood that terms defined in commonly used dictionaries should be interpreted as having meanings consistent with the meanings in the context of the related art, and are expressly defined herein unless they are interpreted in an ideal or overly formal sense.

It should be understood that the term "comprise," or "have" is intended to specify the presence of stated features, integers, steps, operations, elements, components, or combinations thereof in the disclosure, but do not preclude the presence or addition of one or more other features, integers, steps, operations, elements, components, or combinations thereof.

Hereinafter, embodiments of the present invention will be described with reference to the accompanying drawings.

FIG. 1 illustrates a fire alarm device according to an embodiment of the present invention.

Referring to FIG. 1, a fire alarm device 10 may include a sensing system 100, a repeater 200, a receiver 300, and a server 400.

The sensing system 100 may be a system configured to detect whether a fire has occurred. The sensing system 100 may include a plurality of sensing units SM. In FIG. 1, five sensing units SM are exemplarily illustrated, but the embodiment of the present invention is not limited thereto.

Each of the plurality of sensing units SM may detect whether a fire has occurred. Each of the plurality of sensing units SM may transmit a fire detection signal SG-1 to adjacent sensing units SM and/or the repeater 200.

The fire detection signal SG-1 may include a first signal SG-1a and a second signal Sg-1b. The first signal SG-1a may be a signal transmitted to the adjacent sensing units SM. The second signal SG-1b may be a signal transmitted to the repeater 200.

As a method of transmitting the fire detection signal SG-1, a radio frequency (RF) communication method may be used. The RF communication method may be a communication method for exchanging information by radiating a radio frequency. The RF communication method is a broadband communication method using a frequency, and may have high stability due to less influence of climate and environment. The RF communication method can link voice or other additional functions, and may have a fast transmission speed. For example, the RF communication method may use a frequency in a band of 447 MHz to 924 MHz. However, this is only exemplary, and in an embodiment of the present invention, a communication method such as Ethernet, Wifi, LoRA, M2M, 3G, 4G, LTE, LTE-M, Bluetooth, WiFi Direct, or the like may be used.

In an embodiment of the present invention, the RF communication method may include the Listen Before Transmission (LBT) communication method. The LBT communication method is a frequency selection method that determines whether a selected frequency is being used by another system, and when it is determined that the selected frequency is occupied, then selects again another frequency. For example, a node intended for transmission may first listen to a medium, determine if it is in an idle state, and then, flow a back-off protocol prior to the transmission. By subjecting data to distributed processing using the LBT communication method, collisions between signals in the same band may be prevented.

The repeater 200 may communicate with the plurality of sensing units SM. For example, the repeater 200 may communicate with forty sensing units SM. The repeater 200 may receive the fire detection signal SG-1 from the plurality of sensing units SM. The repeater 200 may convert the fire detection signal SG-1 into a first transmission signal SG-2. The repeater 200 may transmit the first transmission signal SG-2 to the receiver 300.

The RF communication method may be used as a method for transmitting the first transmission signal SG-2. The first transmission signal SG-2 may include data included the fire detection signal SG-1.

The receiver 300 may receive the first transmission signal SG-2 from the repeater 200. The receiver 300 may convert the first transmission signal SG-2 into a second transmission signal SG-3. The receiver 300 may transmit the second transmission signal SG-3 to the server 400.

The RF communication method may be used as a method for transmitting the second transmission signal SG-3. The second transmission signal SG-3 may include data included in the fire detection signal SG-1.

The server 400 may determine whether it is a fire situation or not based on the second transmission signal SG-3 received from the receiver 300. When it is determined that it is the fire situation, the server 400 may transmit a warning message and location information to a plurality of persons concerned 20.

The plurality of persons concerned 20 may include, for example, fire stations 119, persons concerned at a place where the fire has occurred, the Ministry of Public Safety and Security (or public institutions involved in the safety of the public), and the like. The plurality of persons concerned 20 may receive the fire warning message in the form of a text message, a video message, or a voice message through a landline phone, a smart phone, other portable terminals, or the like.

Figure 2:
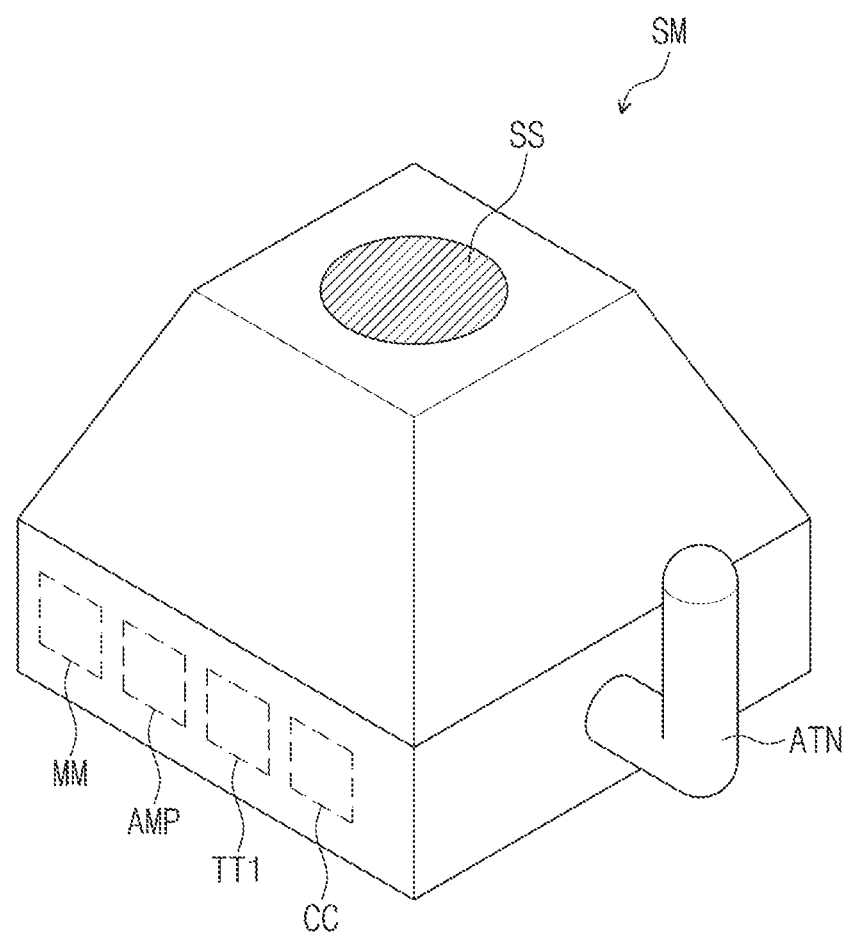
FIG. 2 is a perspective view illustrating one sensing unit among a plurality of sensing units according to an embodiment of the present invention.

FIG. 2 is a perspective view illustrating one sensing unit among a plurality of sensing units according to an embodiment of the present invention.

Referring to FIG. 1 and FIG. 2, each of the plurality of sensing units SM may include different unique address information. Each of the plurality of sensing units SM may include a sensor SS, a sensing memory MM, a sensing communication unit ATN, a sensing control unit CC, an amplification unit AMP, and a battery unit TT1.

The sensor SS may detect at least one of smoke, temperature, humidity, or gas. The sensor SS may generate fire information by detecting at least one of smoke, temperature, humidity, or gas. The fire information may include a value measured by the sensor SS. In FIG. 2, one sensor SS is exemplarily illustrated, but the embodiment of the present invention is not limited thereto. For example, each of the plurality of sensing units SM may include a plurality of sensors, and each of the plurality of sensors may detect at least one of smoke, temperature, humidity, or gas.

Information on the sensor SS may be stored in the sensing memory MM. The sensing unit SM may automatically determine a modulation method for a signal generated by a sensor SS mounted through information stored in the sensing memory MM. Through the automatic modulation method, the sensing unit SM may be set to a state in which the fire detection signal SG-1 may be easily transmitted no matter what type of sensors are mounted on each of the plurality of sensing units SM.

The address information may be stored in the sensing memory MM. An optimal signal transmission path for quickly transmitting the fire detection signal SG-1 to the repeater 200 may be stored in the sensing memory MM.

Information on reference signal strength may be stored in the sensing memory MM. The reference signal strength may refer to a suitable strength and/or intensity of the fire detection signal SG-1 when the sensing communication unit ATN transmits the fire detection signal SG-1. For example, the reference signal strength may be an appropriate received signal strength indicator (RSSI) value of a signal.

The sensing memory MM may include a volatile memory or a non-volatile memory. The volatile memory may include a DRAM, an SRAM, a flash memory, or an FeRAM. The non-volatile memory may include an SSD or an HDD.

The sensing communication unit ATN may transmit the fire detection signal SG-1 to the repeater 200. The sensing communication unit ATN may also transmit the fire detection signal SG-1 to other adjacent sensing units SM. The fire detection signal SG-1 may include the fire information and the address information generated by the sensor SS.

When a fire occurrence signal from the sensor SS is received, the sensing communication unit ATN may transmit the first signal SG-1a to at least one of a plurality of adjacent sensing units SM. When the fire occurrence signal is received from the sensor SS, the sensing communication unit ATN may transmit the second signal SG-1b to the repeater 200.

When it is difficult for the repeater 200 to directly receive the fire detection signal SG-1 since the sensing unit SM and the repeater 200 are far away from each other, the sensing communication unit ATN may transmit the fire detection signal SG-1 to another adjacent sensing unit SM, thereby stably performing signal transmission to the repeater 200. The sensing communication unit ATN may receive the fire detection signal SG-1 from another adjacent sensing unit SM.

The sensing control unit CC may control the strength and/or intensity of the fire detection signal SG-1. Based on the fire detection signal SG-1 controlled by the sensing control unit CC, the sensing communication unit ATN may transmit the fire detection signal SG-1 having appropriate signal strength to the adjacent sensing units SM and the repeater 200.

The amplification unit AMP may amplify the fire detection signal SG-1. The sensing communication unit ATN may receive the fire detection signal SG-1 from another sensing unit SM. In the process of receiving the received fire detection signal SG-1 from another adjacent sensing unit SM, a transmission rate and/or accuracy may be degraded due to a transmission distance and noise. The amplification unit AMP may amplify the fire detection signal SG-1 with degraded quality. Accordingly, the transmission rate and/or accuracy of the fire detection signal SG-1 may be improved. The sensing communication unit ATN may transmit the amplified fire detection signal SG-1 to the repeater 200. The sensing communication unit ATN may transmit the amplified fire detection signal SG-1 to at least one of the plurality of adjacent sensing units SM. The amplified fire detection signal SG-1 may increase accuracy, transmission rate, and transmission distance of a signal transmitted between the plurality of sensing units SM and the repeater 200.

The amplified fire detection signal SG-1 according to an embodiment of the present invention may be transmitted to another adjacent sensing unit SM and amplified again by an amplification unit AMP of the another adjacent sensing unit SM.

According to the present invention, the plurality of sensing units SM may stably transmit data to the plurality of sensing units SM and the repeater 200 using the amplification unit AMP. Accordingly, the reliability of the plurality of sensing units SM may be improved.

The battery unit TT1 may supply power to the sensor SS, the sensing memory MM, the amplification unit AMP, and the sensing communication unit ATN.

The sensing communication unit ATN according to an embodiment of the present invention may use an RF communication method. The RF communication method may consume less power. The power use of the sensing unit SM may be minimized. The sensing unit SM may be driven with low power. Accordingly, the battery unit TT1 may stably supply power to the sensor SS, the sensing memory MM, the amplification unit AMP, and the sensing communication unit ATN for a long period of time.

In addition, according to the present invention, the plurality of sensing units SM are operated separately in a power saving mode that consumes little power and in a normal mode operated in a fire situation, so that the power use of each of the plurality of sensing units SM may be minimized. Accordingly, each of the plurality of sensing units SM may be driven with low power.

Figure 3:
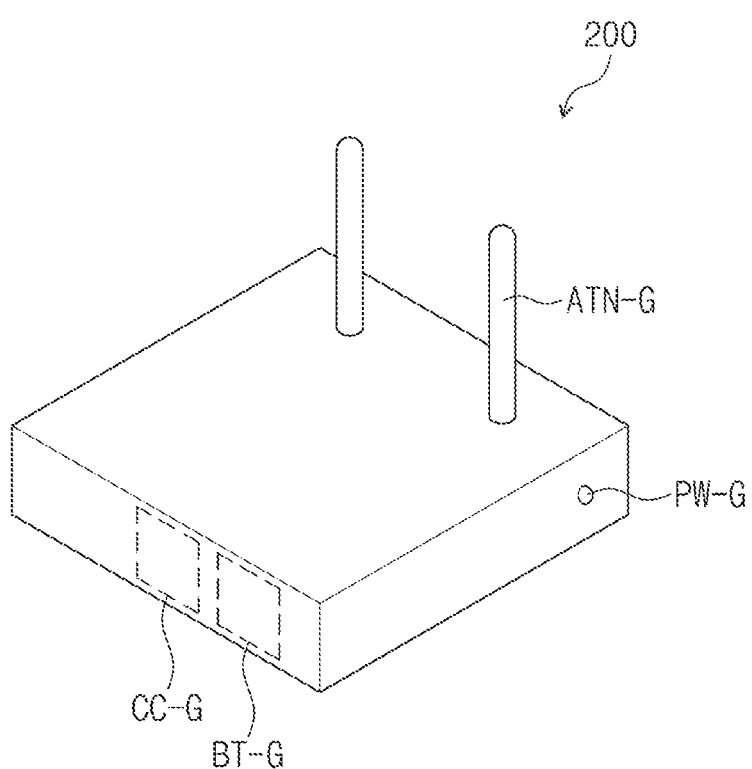
FIG. 3 is a perspective view illustrating a repeater according to an embodiment of the present invention.

FIG. 3 is a perspective view illustrating a repeater according to an embodiment of the present invention.

Referring to FIG. 1 and FIG. 3, the repeater 200 may communicate with a plurality of sensing units SM. For example, one repeater 200 may communicate with forty sensing units SM. However, this is only exemplary, and the number of sensing units SM with which the repeater 200 according to an embodiment of the present invention communicates is not limited thereto.

The repeater 200 may include a communication unit ATN-G, a power unit PW-G, a battery unit BT-G, and a control unit CC-G.

The communication unit ATN-G may communicate with the plurality of sensing units SM and the receiver 300. The communication unit ATN-G may receive the fire detection signal SG-1 from each of the plurality of sensing units SM. The communication unit ATN-G and the sensing communication unit ATN (see FIG. 2) of each of the plurality of sensing units SM may communicate in a wireless manner through an RF communication method. The communication unit ATN-G and a communication unit ATN-R (see FIG. 4) of the receiver 300 may communicate in a wireless manner through an RF communication method.

The power unit PW-G may be supplied with first power from the outside. The first power may supply power to the communication unit ATN-G and the control unit CC-G.

The battery unit BT-G may supply second power. The second power may supply power to the communication unit ATN-G and the control unit CC-G.

According to the present invention, even when the first power supplied from the power unit PW-G is cut off, the battery unit BT-G may supply the second power to allow the repeater 200 to operate. The repeater 200 may stably receive the fire detection signal SG-1 from the plurality of sensing units SM, and may stably transmit the first transmission signal SG-2 to the receiver 300. Accordingly, the reliability of signal transmission may be improved.

The control unit CC-G may convert the fire detection signal SG-1 into the first transmission signal SG-2. When the first power is not supplied from the power unit PW-G to the communication unit ATN-G, the control unit CC-G may supply the second power from the battery unit BT-G to the communication unit ATN-G.

Figure 4:
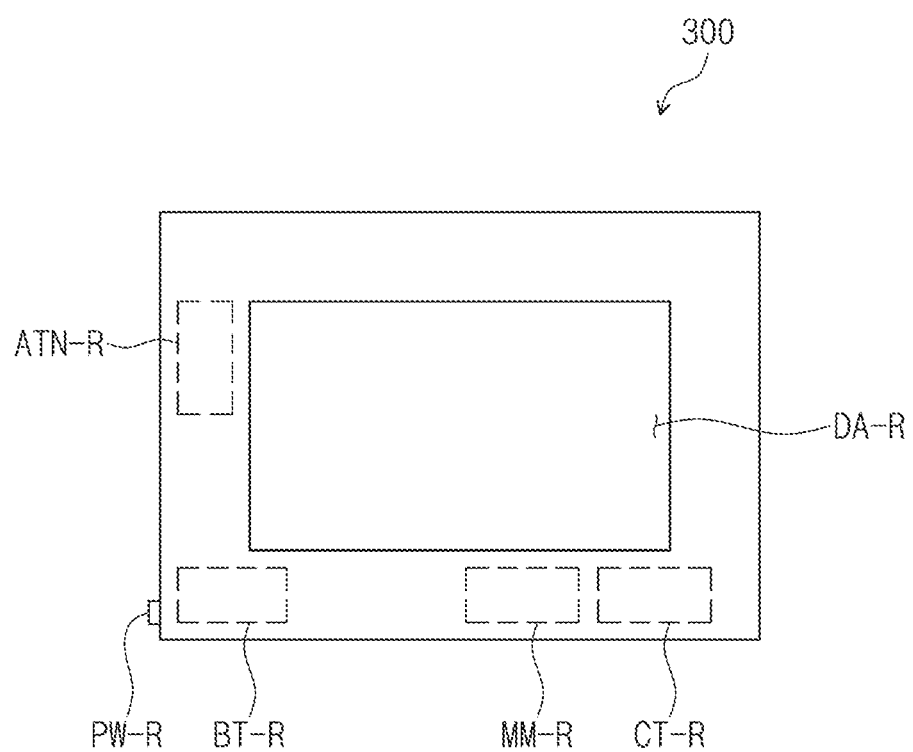
FIG. 4 illustrates a receiver according to an embodiment of the present invention.

FIG. 4 illustrates a receiver according to an embodiment of the present invention.

Referring to FIG. 1 and FIG. 4, the receiver 300 may receive the first transmission signal SG-2 from a plurality of repeaters 200. For example, the receiver 300 may communicate with twenty four repeaters 200. That is, the receiver 300 may communicate with nine hundred and sixty sensing units SM.

The receiver 300 may include the communication unit ATN-R, a power unit PW-R, a battery unit BT-R, a memory MM-R, a control unit CT-R, and a display unit DA-R.

The communication unit ATN-R may communicate with the repeater 200 and the server 400. The communication unit ATN-R may receive the first transmission signal SG-2 from the repeater 200. The communication unit ATN-R and the communication unit ATN-G (see FIG. 3) of the repeater 200 may communicate in a wireless manner through an RF communication method. The communication unit ATN-R may transmit the second transmission signal SG-3 to the server 400. The communication unit ATN-R and a server transmission unit ATN-B (see FIG. 5) of the server 400 may communicate in a wireless manner through an RF communication method.

The power unit PW-R may be supplied with first power from the outside. The first power may supply power to the communication unit ATN-R, the memory MM-R, the control unit CT-R, and the display unit DA-R.

The battery unit BT-R may supply second power. The second power may supply power to the communication unit ATN-R, the memory MM-R, the control unit CT-R, and the display unit DA-R.

According to the present invention, even when the first power supplied from the power unit PW-R is cut off, the battery unit BT-R may supply the second power to allow the repeater 300 to operate. The receiver 300 may stably receive the first transmission signal SG-2 from the repeater 200, and may stably transmit the second transmission signal SG-3 to the server 400. Accordingly, the reliability of signal transmission may be improved.

Address information of each of the plurality of sensing units SM may be stored in the memory MM-R. Based on the address information, location information of each of the plurality of sensing units SM may be stored in the memory MM-R.

The display unit DA-R may provide image information corresponding to the state of the plurality of sensing units SM or the state of the repeater 200. The display unit DA-R may include a liquid crystal display panel or an organic light emitting display panel. The display unit DA-R may receive an external input provided by a user. For example, the display unit DA-R may further include a touch unit.

The control unit CT-R may control each of the plurality of sensing units SM. The user may provide an input to the display unit DA-R to allow the control unit CT-R to control each of the plurality of sensing units SM. For example, the control unit CT-R may control information on a location at which each of the plurality of sensing units SM is disposed, information on the type of a value sensed by each of the plurality of sensing units SM, and/or information on whether each of the sensing units SM operates normally.

Through the repeater 200, the receiver 300 may control the plurality of sensing units SM disposed in various places.

Figure 5:
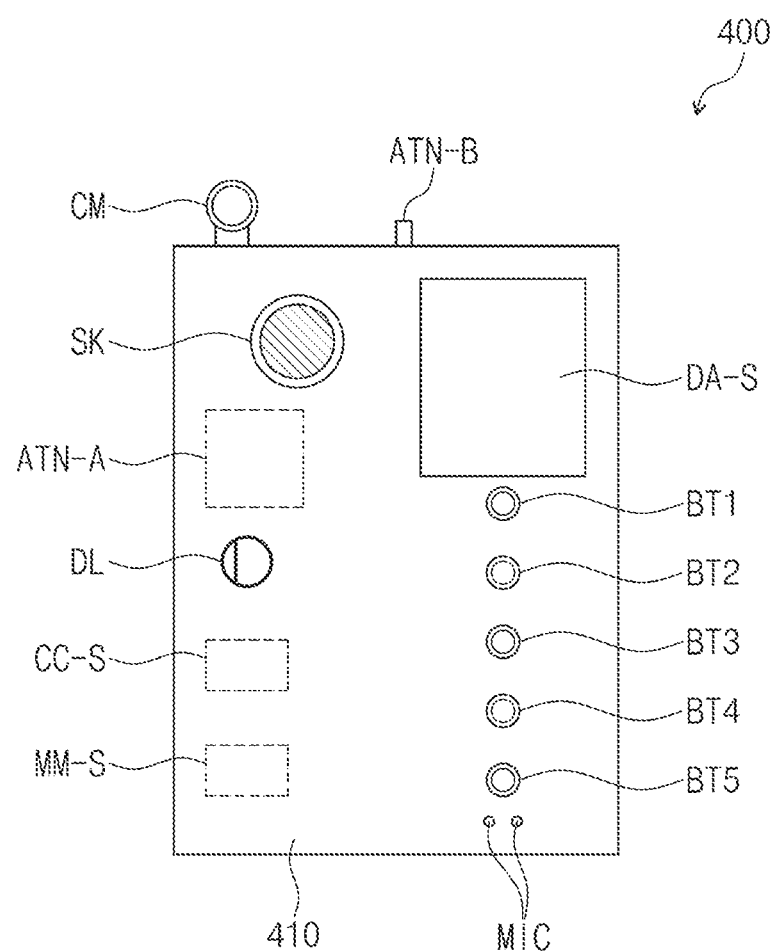
FIG. 5 illustrates a server according to an embodiment of the present invention.

FIG. 5 illustrates a server according to an embodiment of the present invention.

Referring to FIG. 1 and FIG. 5, the server 400 includes a server reception unit ATN-A, a control unit CC-S(or a control circuit), a server memory MM-S, a server transmission unit ATN-B, and a display unit DA-S, a speaker SK, a microphone MIC, a camera CM, first to fifth buttons BT1, BT2, BT3, BT4, and BT5, and a door lock DL.

The server reception unit ATN-A may receive the second transmission signal SG-3 transmitted by the receiver 300.

The control unit CC-S may control the plurality of sensing units SM, the repeater 200, and the receiver 300, and may identify the fire information and address information included in the second transmission signal SG-3.

When the identified address information is the same as previously identified address information, the control unit CC-S may control the server 400 to ignore the corresponding second transmission signal SG-3. When the identified address information is different from the previously identified address information, the control unit CC-S may allow the server 400 to transmit a warning message to persons concerned who correspond to address information identified from the server memory MM-S. Through such control, it is possible to prevent the same warning message from being repeatedly transmitted to the persons concerned 20.

The server memory MM-S may store information (e.g., contact information, addresses, or names) of the persons concerned 20. The information of the persons concerned 20 stored in the server memory MM-S may be matched with the address information of each of the plurality of sensing units SM.

The server memory MM-S may include a volatile memory or a non-volatile memory. The volatile memory may include a DRAM, an SRAM, a flash memory, or an FeRAM. The non-volatile memory may include an SSD or an HDD.

The server transmission unit ATN-B may transmit a fire alarm message to the persons concerned 20. The server 400 may transmit the fire alarm message to the persons concerned 20 who respond to identified address information among the information of the persons concerned 20 stored in the server memory MM-S. At this time, the persons concerned 20 who respond to the identified address information may include an owner of a place where a fire has occurred, family members of the owner of the place where the fire has occurred, an owner of a place adjacent to the place where the fire has occurred, a fire station within the jurisdiction, or public institutions concerned.

The server transmission unit ATN-B may transmit a reception signal to the receiver 300 indicating that the second transmission signal SG-3 has been received. The receiver 300 which has received the reception signal may determine that the transmitted second transmission signal SG-3 has been properly transferred to the server 400.

The server transmission unit ATN-B may transmit information by a Wideband Code Division Multiple Access (WCDMA) communication method. The WCDMA is more resistant to frequency selective fading as a band is wider, and when the same data is transmitted, a bandwidth is increased, which increases a processing gain, so that the capacity may increase due to reduced interference. In addition, since a multi-path may be resolved, propagation delay in an indoor environment may be overcome even in the case of a microcell. Accordingly, the WCDMA may be effective in transmitting a fire alarm message in a fire occurrence situation in which a message should be transmitted quickly and stably since it is an urgent situation. In addition, it is advantageous in terms of a subscriber capacity since the bandwidth efficiency per 1 MHz bandwidth is excellent, and costs at the time of implementation may be reduced since the processing gain is reduced, which reduces the capacity of a power amplifier, and the power consumption and size of a terminal may be reduced by reducing the size of the power amplifier.

The display unit DA may provide image information corresponding to the state of the receiver 300 or the state of the plurality of sensing units SM. The display unit DA may include a liquid crystal display panel or an organic light emitting display panel.

When the server 400 receives the second transmission signal SG-3, the speaker SK may emit an alarm sound.

The microphone MIC may recognize the voice of a user in the vicinity of the server 400. The microphone MIC may be used to recognize a user's voice command in an emergency situation. In this case, the server 400 may have a built-in program or system for recognizing a user's voice command.

The camera CM may detect and/or recognize the motion of the user in the vicinity of the server 400.

The user may press the first button BT1 or apply a touch to manually report a fire to a fire department within the jurisdiction, and the like. In an initial fire stage, such as before the plurality of sensing unit SM detect a fire, the server 400 may quickly report a fire if nearby people find the fire.

The user may press the second button BT2 or apply a touch to stop the speaker SK from generating an alarm sound.

The user may press the third button BT3 or apply a touch to communicate (or call) with an external communication device. After the user presses the third button BT3, the user may transmit voice information to the other party through the microphone MIC, and receive voice information from the other party through the speaker SK.

The user may press the fourth button BT4 or apply a touch to check the state of the plurality of sensing units SM, the repeater 200, and the receiver 300. For example, although a fire has not occurred, the server 400 may receive a virtual second transmission signal SG-3 from the receiver 300, and the server 400 may transmit a warning message to at least one of the persons concerned 20. In this manner, it is possible to check whether the fire alarm device 10 according to an embodiment of the present invention operates normally.

In addition, the server 400 may transmit an operation state check signal to each of the plurality of sensing units SM. Each of the plurality of sensing units operating in the power saving mode may receive the operation state check signal, and then operate in the normal mode. At this time, each of the plurality of sensing units may transmit the communication operation state to the first server 400 through the repeater 200 and the receiver 300, and then operate in the power saving mode.

The user may press the fifth button BT5 or apply a touch to initialize the signal transmission path stored in the sensor memory MM (see FIG. 3) of each of the plurality of sensing units SM.

The user may open an external case of the server 400 by using the door lock DL. After the external case is open, the built-in parts may be easily inspected.

Although not illustrated, the server 400 may include a separate battery thereinside. In addition, when the power supply applied to itself is interrupted, the server 400 may include a function of recording the interruption of power supply, and notifying the relevant contents to persons concerned.

Figure 6:
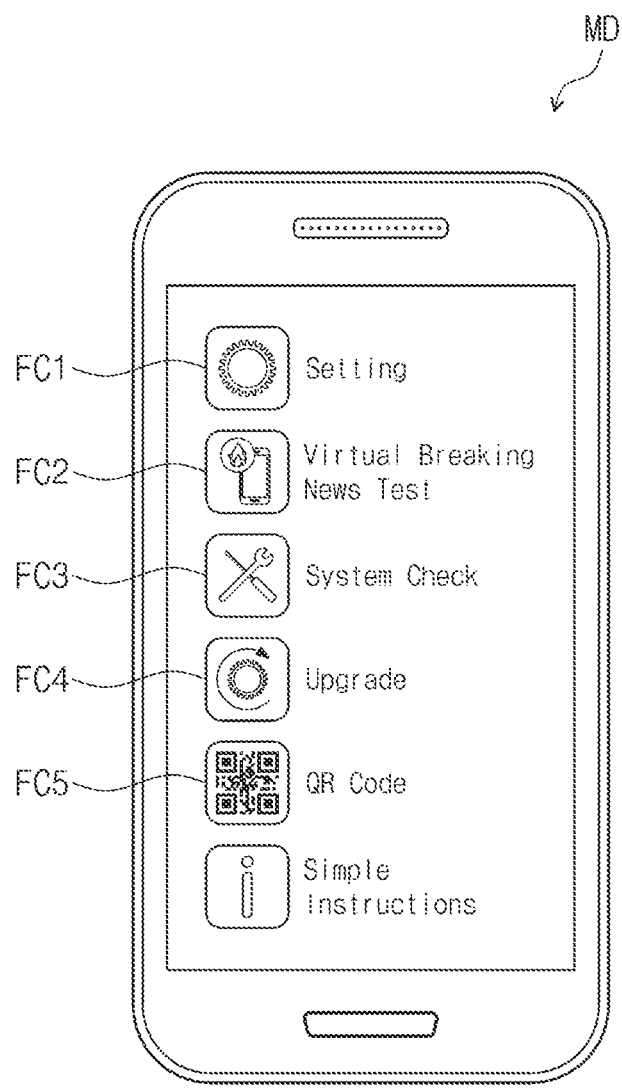
FIG. 6 illustrates a terminal of a person concerned according to an embodiment of the present invention.

FIG. 6 illustrates a terminal of a person concerned according to an embodiment of the present invention.

Referring to FIG. 1 and FIG. 6, a terminal MD may include a smart phone, a desktop computer, a laptop computer, a tablet PC, a wearable device, or the like. However, this is only exemplary, and the terminal MD according to an embodiment of the present invention may include various devices capable of communication. FIG. 6 illustrates a smart phone as an example of the terminal MD of the person concerned.

The person concerned may use the terminal MD to remotely control the plurality of sensing units SM, the repeater 200, the receiver 300, or the server 400. At this time, the terminal MD may transmit a remote control signal to the plurality of sensing units SM, the repeater 200, the receiver 300, or the server 400.

Functions FC1, FC2, FC3, and FC4 which may be controlled by using the terminal MD may include a first function FC1, a second function FC2, a third function FC3, and a fourth function FC4.

The first function FC1 may be a setting function. The person concerned 20 may use the first function FC1 to input the serial number of each of the plurality of sensing units SM, input information (contact information) of the persons concerned 20 who will receive a fire alarm message, or input the address of a place where each of the plurality of sensing units SM is installed.

The second function FC2 may be a virtual breaking news test function. The person concerned 20 may use the second function FC2 to check whether the server 400 normally transmits a fire alarm message from a remote location.

The third function FC3 may be a system check function. The person concerned 20 may use the third function FC3 to check the operation state (e.g., whether power is normally applied, etc.) of the plurality of sensing units SM, the repeater 200, the receiver 300, or the server 400.

The fourth function FC4 may be an upgrade function. The person concerned 20 may use the terminal MD to remotely check the version of firmware of the plurality of sensing units SM, the repeater 200, the receiver 300, or the server 400 and to upgrade the firmware, etc.

The fifth function FC5 may be a function of capturing a QR code. Each of the plurality of sensing units SM may include a QR code including address information. The terminal MD may capture the QR code. The terminal MD may read the address information of the plurality of sensing units SM by interpreting the QR code. The terminal MD may access the memory MM-S(see FIG. 5) of the server 400 to access information stored in the memory MM-S (see FIG. 5). The terminal MD may modify the information stored in the memory MM-S(see FIG. 5). The information may be information on each of the plurality of sensing units SM. For example, the terminal MD may modify the address information stored in the memory MM-S(see FIG. 5) to the address information read through the QR code. The terminal MD may store the modified information in the memory MM-S(see FIG. 5).

According to the present invention, the person concerned 20 may directly or indirectly access the plurality of sensing units SM, the repeater 200, the receiver 300, and the server 400 through the terminal MD. The person concerned 20 may prepare for various errors which might occur in the process of operating the fire alarm device 10 through the terminal MD associated with the plurality of sensing units SM, the repeater 200, the receiver 300, and the server 400. The person concerned 20 can quickly cope with the error. Accordingly, it is possible to provide the fire alarm device 10 with improved reliability.

Figure 7:
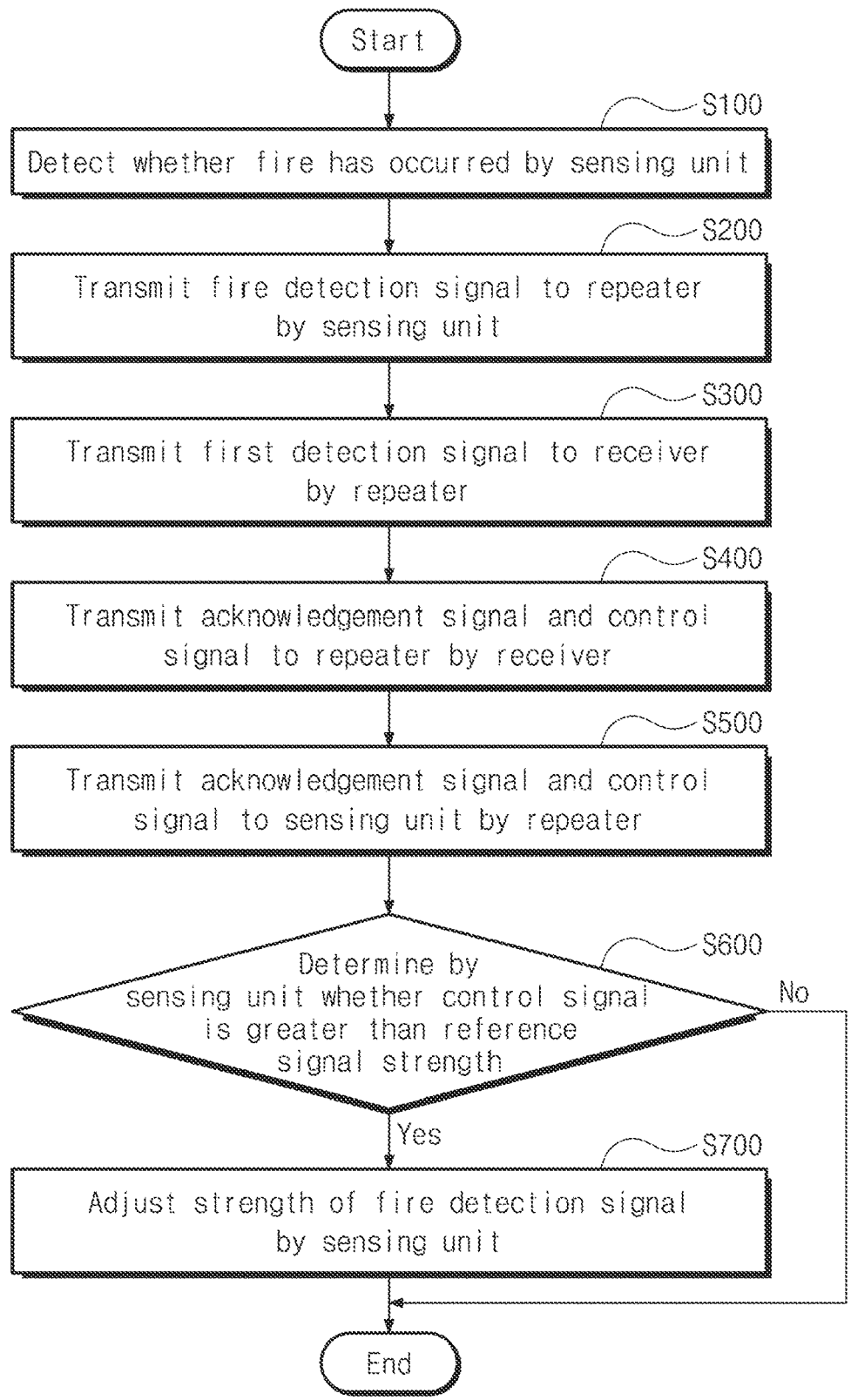
FIG. 7 is a flowchart illustrating a traffic control method according to an embodiment of the present invention.
Figure 8:
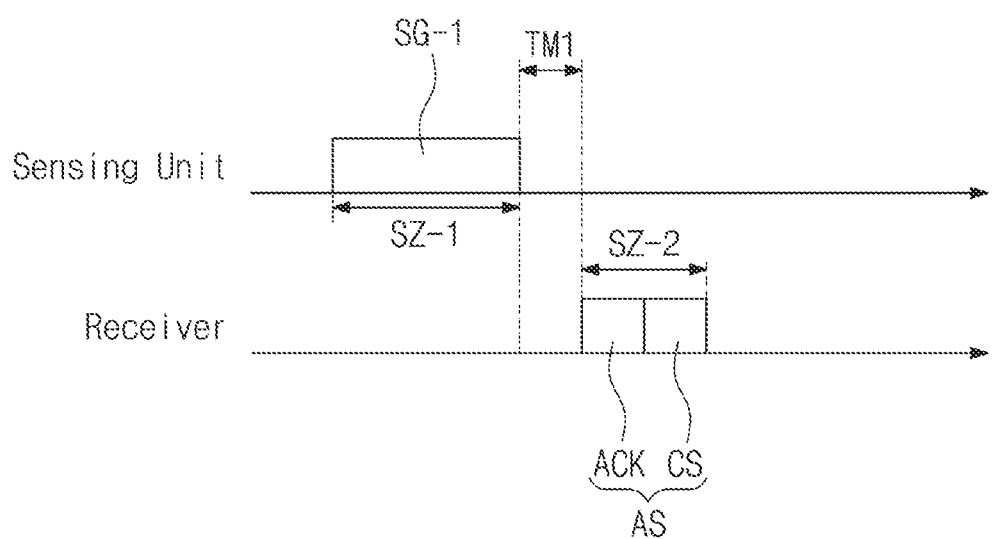
FIG. 8 is a diagram illustrating how a fire detection signal and a reception signal according to an embodiment of the present invention operate.

FIG. 7 is a flowchart illustrating a traffic control method according to an embodiment of the present invention, and FIG. 8 is a diagram illustrating how a fire detection signal and a reception signal according to an embodiment of the present invention operate.

Referring to FIG. 1, FIG. 7, and FIG. 8, each of a plurality of sensing units SM may detect whether a fire has occurred S100. The sensing unit SM which has detected whether a fire has occurred may generate a fire detection signal SG-1.

The sensing unit SM may transmit the fire detection signal SG-1 to a repeater 200 S200.

The repeater 200 may convert the fire detection signal SG-1 into a first transmission signal SG-2. The fire detection signal SG-1 and the first transmission signal SG-2 may be signals including substantially the same information.

The repeater 200 may transmit the first transmission signal SG-2 to a receiver 300.

Based on address information included in the first transmission signal SG-2, the receiver 300 may determine a sensing unit SM which has transmitted the fire detection signal SG-1.

When the first transmission signal SG-2 is received, the receiver 300 may transmit a reception signal AS to the repeater 200 S400. The reception signal AS may include an acknowledgment signal ACK and a control signal CS. The acknowledgment signal ACK and the control signal CS may be integrally transmitted.

According to the present invention, the acknowledgment signal ACK and the control signal CS may be provided and transmitted in the same data frame. Signal transmission efficiency may be improved by transmitting signals having various information including the acknowledgment signal ACK and the control signal CS together by means of one communication means called the reception signal AS. In addition, the reception signal AS may stably perform signal processing and signal management by excluding a case in which one of the acknowledgment signal ACK and the control signal CS is not transmitted. Accordingly, it is possible to provide the fire alarm device 10 with improved reliability.

The acknowledgment signal ACK may be a signal acknowledging to the plurality of sensing units SM that the fire detection signal SG-1 and the first transmission signal SG-2 have been normally received. The acknowledgment signal ACK may include information on the sensing unit SM which has transmitted the fire detection signal SG-1.

The control signal CS may include information on a received signal strength indicator (RSSI) of the fire detection signal SG-1.

A magnitude SZ-1 of the fire alarm signal SG-1 may be greater than a magnitude SZ-2 of the reception signal AS. The density of traffic when the fire alarm signal SG-1 is transmitted may be greater than the density of traffic when the reception signal AS is transmitted.

A first time TM1 may be a short inter-frame space (SIFS). The first time TM1 may be the shortest waiting delay time. Accordingly, the reception signal AS may have the highest priority in being transmitted to the plurality of sensing units SM. The first time TM1 may be the sum of the time required for processing the received fire alarm signal SG-1 and the time consumed for transmitting a response.

According to the present invention, the first time TM1 may be the minimum time required for transmitting a response as soon as the fire alarm signal SG-1 is received. The plurality of sensing units SM and a repeater 200 may perform a quick communication with each other. In a fire situation, a fire alarm system may induce a quick response. Accordingly, it is possible to provide the fire alarm system with improved reliability.

In addition, unlike the present invention, when the acknowledgment signal ACK and the control signal CS are separately transmitted, the amount of signals transmitted between the plurality of sensing units SM, the repeater 200, and the receiver 300 may increase, resulting in an increase in traffic density. Accordingly, the signals may be lost, or interference may occur between the signals, resulting in data loss. However, according to the present invention, since the acknowledgment signal ACK and the control signal CS are integrally transmitted in one data frame, the traffic density may be reduced. That is, the amount of signals transmitted between the plurality of sensing units SM, the repeater 200, and the receiver 300 may be reduced. The amount of traffic between the plurality of sensing units SM, the repeater 200, and the receiver 300 may be reduced. Accordingly, it is possible to provide the fire alarm device 10 with improved reliability.

The repeater 200 may transmit the reception signal AS to the sensing unit SM S500.

The sensing unit SM may compare the control signal CS with reference signal strength stored in the sensing memory MM (see FIG. 2) S600.

When the sensing unit SM determines that the value of the control signal CS is greater than the reference signal strength, the control unit CC (see FIG. 2) of the sensing unit SM may adjust the strength of the fire detection signal SG-1 S700. For example, the control unit CC (see FIG. 2) may reduce the strength of the fire detection signal SG-1 to be less than or equal to the reference signal strength. The above will be described later.

Figure 9:
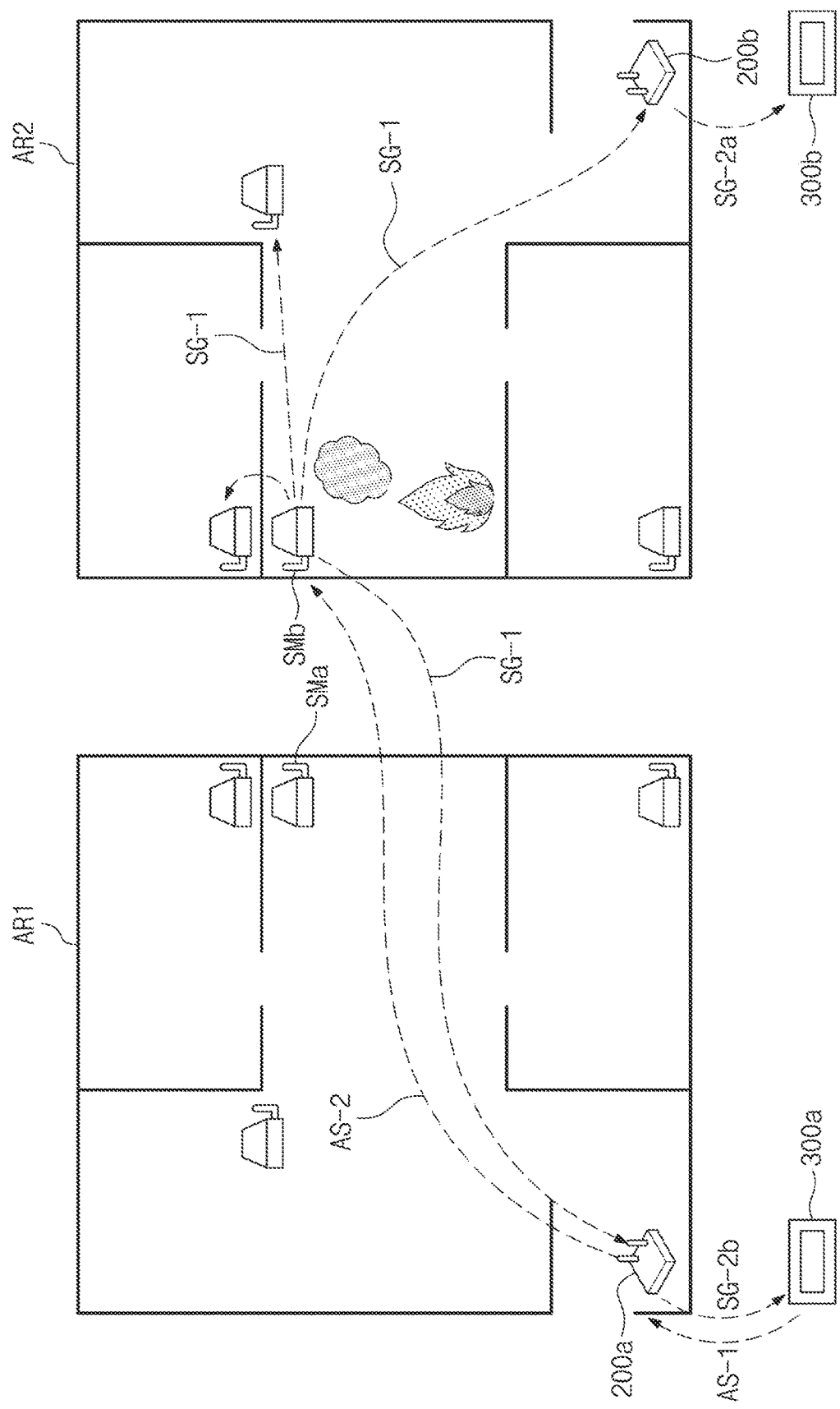
FIG. 9 is a diagram illustrating an operation of a fire alarm device according to an embodiment of the present invention.

FIG. 9 is a diagram illustrating an operation of a fire alarm device according to an embodiment of the present invention.

Referring to FIG. 1 and FIG. 9, a fire alarm device 10 having a traffic control function may be installed and used in a building. However, this is only exemplary, and the fire alarm device 10 according to an embodiment of the present invention may be installed and used in various places where a fire may occur. For example, the fire alarm device 10 may be installed and used in public transportation.

A plurality of sensing units SM may be respectively disposed in rooms and hallways of the building. The plurality of sensing units SM may be disposed at regular intervals from each other so as to be able to respond according to circumstances when a fire occurs.

The fire alarm device 10 may include a plurality of first sensing units SMa, a first repeater 200a, and a first receiver 300a, which are disposed in a first zone AR1, and a plurality of second sensing units SMb, a second repeater 200b, and a second receiver 300b, which are disposed in a second zone AR2 spaced apart from the first zone AR1. For example, the second zone AR2 may be included in another building adjacent to a building in which the first zone AR1 is included.

The plurality of first sensing units SMa may detect the occurrence of a fire and generate a first fire detection signal. The plurality of first sensing units SMa may communicate with the first repeater 200a in a wireless manner. The first repeater 200a may communicate with the first receiver 300a in a wireless manner.

The plurality of second sensing units SMb may detect the occurrence of a fire and generate a second fire detection signal SG-1. The plurality of second sensing units SMb may communicate with the second repeater 200b in a wireless manner. The second repeater 200b may communicate with the second receiver 300b in a wireless manner.

For example, when a fire occurs in the second zone AR2, the second sensing unit SMb adjacent to the zone where the fire has occurred may detect the fire and generate the second fire detection signal SG-1. The second sensing unit SMb may transmit the second fire detection signal SG-1 to another adjacent second sensing unit SMb and the second repeater 200b. The second repeater 200b may transmit a first transmission signal SG-2a generated based on the second fire detection signal SG-1 to the second receiver 300b. The second receiver 300b may transmit a signal indicating the occurrence of the fire to the server 400, and the server 400 may transmit a fire alarm message to persons concerned 20 to notify of the occurrence of the fire.

The second fire detection signal SG-1 transmitted by the second sensing unit SMb may be transmitted to the first repeater 200a if the signal has sufficient strength to be transmitted to the first zone AR1. The first repeater 200a may generate a first transmission signal SG-2b based on the second fire detection signal SG-1. The first transmission signal SG-2b may include information on the second fire detection signal SG-1. The first repeater 200a may transmit the first transmission signal SG-2b to the first receiver 300a.

When the first receiver 300a of the fire alarm device 10 according to an embodiment of the present invention receives the first transmission signal SG-2b generated based on the second fire detection signal SG-1, the first receiver 300a may transmit a first reception signal AS-1 to the first repeater 200a. The first reception signal AS-1 may include an acknowledgment signal ACK (see FIG. 8) and a control signal CS (see FIG. 8). The first repeater 200a may transmit a second reception signal AS-2 generated based on the first reception signal AS-1 to the second sensing unit SMb. The second sensing unit SMb may adjust the strength of the second fire detection signal SG-1 based on the control signal CS (see FIG. 8). When the value of the control signal CS (see FIG. 8) is greater than reference signal strength stored in a sensing memory MM (see FIG. 2), the second sensing unit SMb may reduce the strength of the second fire detection signal SG-1.

Unlike the present invention, when the strength of the second fire detection signal SG-1 generated by the second sensing unit SMb is greater than the reference signal strength, the second fire detection signal SG-1 may be continuously transmitted to the first repeater 200a, and the first repeater 200a and the first receiver 300a may operate. The strength of the second fire detection signal SG-1 may be stronger than necessary, causing a battery unit TT1 of the second sensing unit SMb to consume quickly. In addition, traffic may increase as the second sensing unit SMb, the first repeater 200a, and the first receiver 300a transmit and receive signals to each other. This may cause a problem in that signal transmission and response are slowed down in a fire situation which require rapid communication of the situation. However, according to the present invention, the first receiver 300a transmits the control signal CS (see FIG. 8) to the second sensing unit SMb, and the second sensing unit SMb may adjust the strength of the second fire detection signal SG-1 based on the control signal CS (see FIG. 8). That is, the second sensing unit SMb may reduce the strength of the second fire detection signal SG-1 to prevent the second fire detection signal SG-1 from being transmitted to the first zone AR1. Accordingly, it is possible to provide the fire alarm device 10 having a traffic control function with improved reliability by preventing unnecessary signal transmission and reception.

Figure 10:
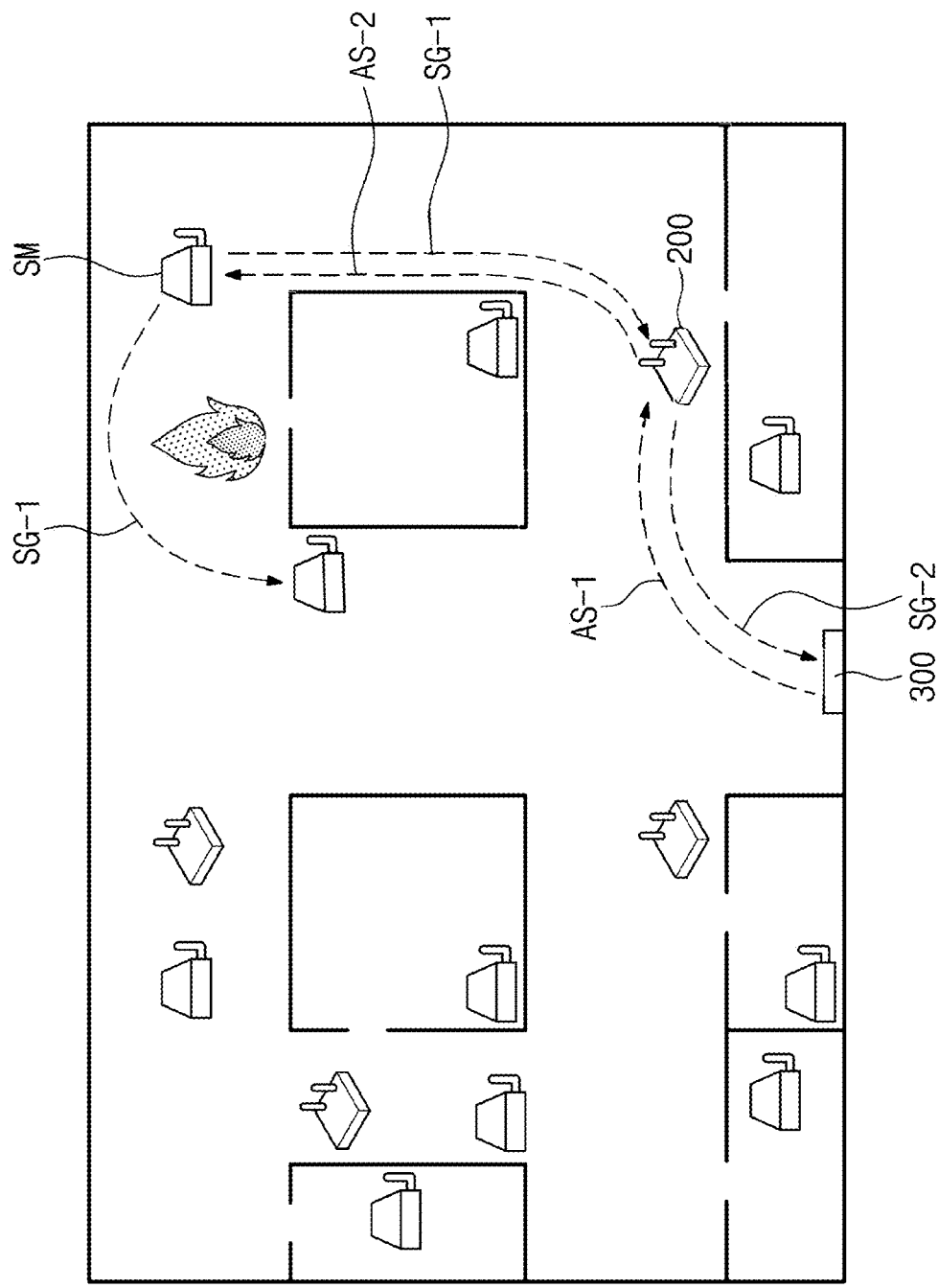
FIG. 10 is a diagram illustrating an operation of a fire alarm device according to an embodiment of the present invention.

FIG. 10 is a diagram illustrating an operation of a fire alarm device according to an embodiment of the present invention.

Referring to FIG. 1 and FIG. 10, a fire alarm device 10 according to an embodiment of the present invention may be installed and used in a building. FIG. 10 illustrates one floor in the building.

A plurality of sensing units SM may be respectively disposed in rooms and hallways of the building. A plurality of repeaters 200 may be disposed to easily receive signals from the plurality of sensing units SM. One receiver 300 may be disposed on each floor of the building.

The plurality of sensing units SM may detect the occurrence of a fire and generate a fire detection signal SG-1. The plurality of sensing units SM may communicate with an adjacent repeater 200 in a wireless manner. The repeater 200 may communicate with the receiver 300 in a wireless manner.

For example, when a fire occurs in the building, a sensing unit SM adjacent to a zone where the fire has occurred may detect the occurrence of the fire and generate the fire detection signal SG-1. The sensing unit SM may transmit the fire detection signal SG-1 to another adjacent sensing unit SM and the repeater 200. The repeater 200 may transmit a first transmission signal SG-2 generated based on the fire detection signal SG-1 to the receiver 300. The receiver 300 may transmit a signal indicating the occurrence of the fire to a server 400, and the server 400 may transmit a fire alarm message to persons concerned 20 to notify of the occurrence of the fire.

When the receiver 300 of the fire alarm device 10 according to an embodiment of the present invention receives the first transmission signal SG-2 generated based on the fire detection signal SG-1, the receiver 300 may transmit a first reception signal AS-1 to the repeater 200. The first reception signal AS-1 may include an acknowledgment signal ACK (see FIG. 8) and a control signal CS (see FIG. 8). The repeater 200 may transmit a second reception signal AS-2 generated based on the first reception signal AS-1 to the sensing unit SM. The sensing unit SM may adjust the strength of the fire detection signal SG-1 based on the control signal CS (see FIG. 8). When the value of the control signal CS (see FIG. 8) is greater than reference signal strength stored in a sensing memory MM (see FIG. 2), the sensing unit SM may reduce the strength of the fire detection signal SG-1. When the value of the control signal CS (see FIG. 8) is equal to or less than the reference signal strength stored in the sensing memory MM (see FIG. 2), the sensing unit SM may reduce the strength of the fire detection signal SG-1.

According to the present invention, the sensing unit SM may prevent the fire detection signal SG-1 from being detected by a sensing unit installed in another zone outside a zone where a plurality of sensing units are installed. Accordingly, it is possible to provide the fire alarm device 10 having a traffic control function with improved reliability by preventing unnecessary signal transmission and reception.

Although the present invention has been described with reference to preferred embodiments of the present invention, it will be understood by those skilled in the art that various modifications and changes in form and details may be made therein without departing from the spirit and scope of the present invention as set forth in the following claims. Accordingly, the technical scope of the present invention is not intended to be limited to the contents set forth in the detailed description of the specification, but is intended to be defined by the appended claims.

INDUSTRIAL APPLICABILITY

In the event of a fire, providing a user with information on whether a fire has occurred is essential in coping with the fire. Therefore, the present invention about a fire alarm device has high industrial applicability.

The invention claimed is:

1. A fire alarm device comprising:
   a first sensing unit disposed in a first zone, and configured to detect the occurrence of a fire and generate a first fire detection signal;
   a first repeater configured to perform wireless communication with the first sensing unit;
   a first receiver configured to perform wireless communication with the first repeater;
   a second sensing unit disposed in a second zone spaced apart from the first zone, and configured to detect the occurrence of a fire and generate a second fire detection signal;
   a second repeater configured to perform wireless communication with the second sensing unit; and
   a second receiver configured to perform wireless communication with the second repeater,
   wherein when information on the second fire detection signal is received, the first receiver transmits a control signal to the second sensing unit, wherein the second sensing unit adjusts the strength of the second fire detection signal based on the control signal.

2. A fire alarm device comprising:
   a first sensing unit disposed in a first zone, and configured to detect the occurrence of a fire and generate a first fire detection signal;
   a first repeater configured to perform wireless communication with the first sensing unit;
   a first receiver configured to perform wireless communication with the first repeater;
   a second sensing unit disposed in a second zone spaced apart from the first zone, and configured to detect the occurrence of a fire and generate a second fire detection signal;
   a second repeater configured to perform wireless communication with the second sensing unit; and
   a second receiver configured to perform wireless communication with the second repeater,
   wherein when information on the second fire detection signal is received, the first receiver transmits a control signal to the second sensing unit, wherein the second sensing unit adjusts the strength of the second fire detection signal based on the control signal, and wherein when the value of the control signal is greater than the magnitude of reference signal strength, the second sensing unit reduces the strength of the second fire detection signal.

3. The fire alarm device of claim 2, wherein the second sensing unit is provided in plurality, wherein each of the plurality of second sensing units includes:
   a sensor configured to generate the second fire detection signal when it is determined that it is a fire situation by detecting at least one of smoke, temperature, humidity, or gas;
   a sensing memory unit configured to store the reference signal strength;
   an amplification unit configured to generate an amplified fire alarm signal by amplifying the second fire detection signal received from at least one of a plurality of adjacent sensing units;
   a sensing control unit configured to control the strength of the second fire detection signal; and
   a sensing communication unit configured to receive the second fire detection signal or the amplified fire alarm signal, transmit the second fire detection signal or the amplified fire alarm signal to the repeater, and receive the control signal.

4. The fire alarm device of claim 1, wherein the control signal comprises a received signal strength indicator (RSSI).

5. The fire alarm device of claim 1, wherein when the second fire detection signal is received, the first receiver further transmits an acknowledgment signal for the second fire detection signal to the second sensing unit.

6. The fire alarm device of claim 5, wherein the acknowledgment signal and the control signal are integrally transmitted.

7. The fire alarm device of claim 5, wherein the acknowledgment signal and the control signal are provided in the same data frame.

8. The fire alarm device of claim 5, wherein when the first fire detection signal is received, the first receiver transmits an acknowledgment signal for the first fire detection signal and the control signal to the first sensing unit.

9. The fire alarm device of claim 1, wherein:
the first receiver transmits the control signal to the first sensing unit; and
the first sensing unit adjusts the strength of the first fire detection signal based on the control signal.

10. The fire alarm device of claim 9, wherein when the value of the control signal is greater than the magnitude of a reference signal strength, the first sensing unit reduces the strength of the first fire detection signal.

11. A fire alarm device comprising:
a plurality of sensing units configured to detect the occurrence of a fire and generate a fire detection signal;
a repeater configured to perform wireless communication with each of the plurality of sensing units; and
a receiver configured to perform wireless communication with the repeater, wherein the receiver transmits a control signal to each of the plurality of sensing units, wherein each of the plurality of sensing units adjusts the strength of the fire detection signal based on the control signal;
wherein when the value of the control signal is greater than the magnitude of reference signal strength, the sensing unit reduces the strength of the fire detection signal.

12. The fire alarm device of claim 11, wherein the control signal is a received signal strength indicator (RSSI).

13. The fire alarm device of claim 11, wherein when the first fire detection signal is received, the receiver further transmits an acknowledgment signal for the fire detection signal to each of the plurality of sensing units.

14. The fire alarm device of claim 13, wherein the acknowledgment signal and the control signal are integrally transmitted.

15. The fire alarm apparatus of claim 13, wherein the acknowledgment signal and the control signal are provided in the same data frame.

* * * * *